April 23, 1935.  J. DE LA CIERVA  1,999,136
AUTOROTATIVE WINGED AIRCRAFT
Filed July 15, 1932   2 Sheets-Sheet 1
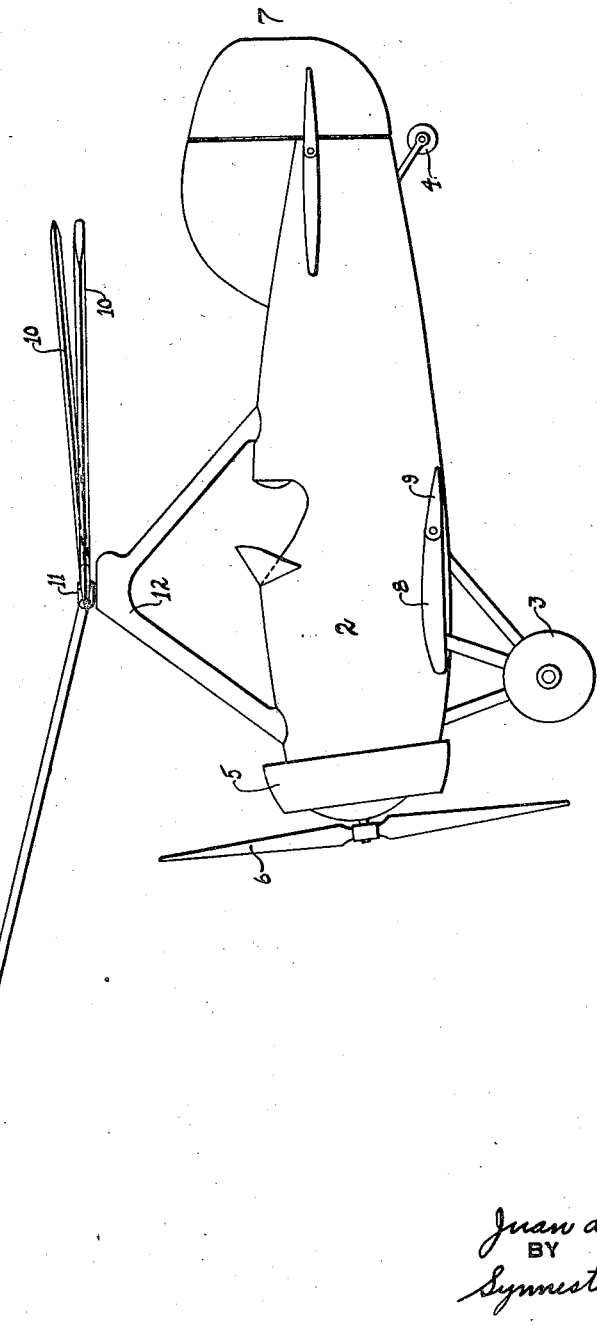

April 23, 1935.  J. DE LA CIERVA  1,999,136
AUTOROTATIVE WINGED AIRCRAFT
Filed July 15, 1932   2 Sheets-Sheet 2
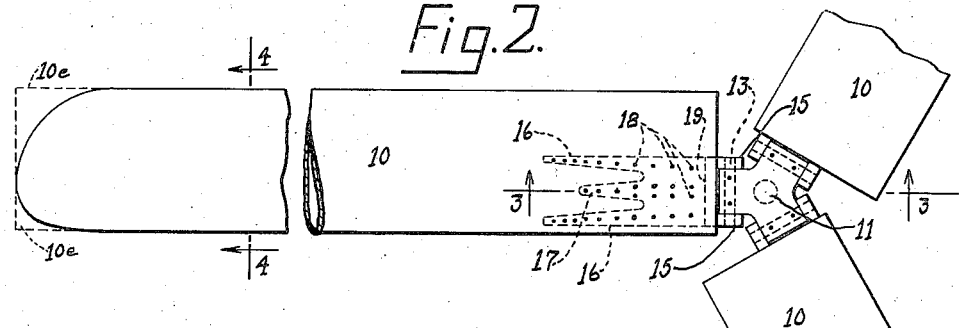
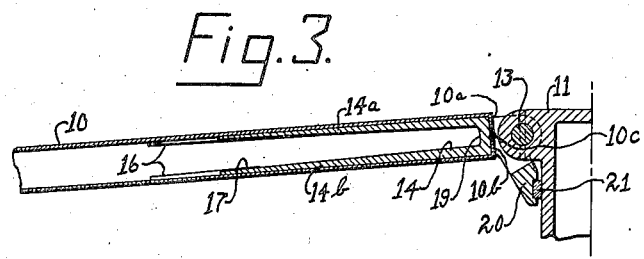
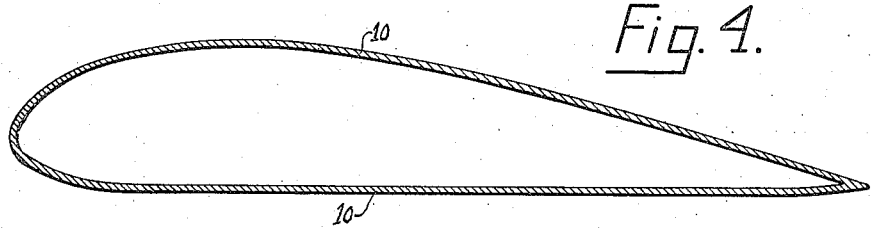
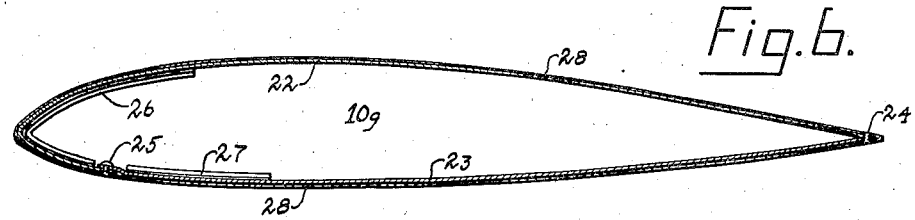
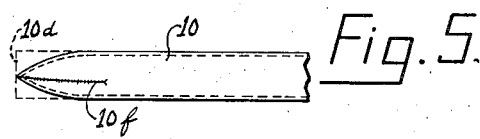
INVENTOR
Juan de la Cierva
BY
Synnestvedt + Lechner
ATTORNEYS.

Patented Apr. 23, 1935

1,999,136

UNITED STATES PATENT OFFICE 1,999,136

AUTOROTATIVE-WINGED AIRCRAFT

Juan de la Cierva, Madrid, Spain, assignor to Autogiro Company of America, Philadelphia, Pa., a corporation of Delaware Application July 15, 1932, Serial No. 622,634

19 Claims. (Cl. 170—164)

This invention relates to auto-rotative-winged aircraft and more especially to sustaining or air rotors adapted for use in machines of the type in which the wings are rotatively mounted for actuation by the relative air-flow produced either by vertical descent or by translational movement of the craft under the influence of its usual propeller and also relates to rotor manufacture.

One of the primary objects of my invention is to improve the operation of an air rotor, especially of the character just mentioned, both as to its efficiency and as to its smoothness or freedom from vibration.

Another object of the invention is to reduce construction, maintenance and repair costs of, and to simplify, the rotary wing construction.

Still another object of the invention is to utilize the simplified rotary wing structure itself as the primary means for effecting smoother rotor operation. In other words, I have devised a way of simplifying rotor blade construction which at the same time can be used to reduce or prevent resonant or other vibrations in the rotor, which latter are highly detrimental and may even be dangerous.

Still further, the present invention contemplates the employment of a simpler rotor blade or wing construction as a means for, or in aid of, simplifying the rotor hub and associated parts.

In general, this invention contemplates a rotor and especially a rotor blade construction which combines and improves upon most of the advantages of several forms of prior construction while obviating a number of the practical problems and difficulties heretofore arising. For example, the construction of the present invention, as to simplicity, is an improvement upon the simple construction in my prior Patent No. 1,590,497; as to efficiency and smoothness of operation (especially in small machines) is comparable with the construction shown in my Patent No. 1,859,584; for ease of manufacture and repair and for the best utilization of available weight compares well with the construction shown in my copending application Serial No. 532,603, filed April 24, 1931 which issued as Patent No. 1,949,785; and for smooth contour and aerodynamic efficiency is equal or possibly superior to the construction shown in my copending application Serial No. 614,399, filed May 31, 1932 which issued as Patent No. 1,969,781. In addition, the blade or wing itself, as well as the rotor, as a whole, is less expensive to make and maintain and is less subject to damage. In general, the blade presents a number of decidedly practical advantages over various prior art devices now in regular use.

Broadly, I contemplate the total or substantial elimination of the main longitudinal spar, spars, or other strength members, and at the same time a stiffening of the wing or blade at least in its general plane, and this in such manner that the individual vertically extending pivot pin now normally provided for each blade of the rotor may even be eliminated, especially in machines having small-diameter, high-speed rotors with blades of very narrow chord. These general objects I preferably obtain by forming the shell or aerodynamic skin of the blade, itself, as the main (or even the sole) structural blade member, thus reducing to a minimum or even eliminating the ordinary internal longitudinal spar, the internal transverse ribs, and other parts. In considering how I utilize this construction to eliminate, in some cases, the individual vertical articulation for the blade, and to otherwise simplify the hub and blade supporting structure, a few comments as to difficulties heretofore encountered will be helpful.

In rotor construction such as employed in the pivoted-wing machine which is shown in my Patent No. 1,590,497, and in which the wing is pivoted to the hub or axis member by a single articulation located generally transverse the axis of the rotor, stresses have been encountered which in some rotors have produced wear upon the pivot and pivot bearings, and under some circumstances vibration has been quite noticeable. In the construction shown in my Patent No. 1,859,584, such stresses and wear have been reduced, relieved or obviated by placing the pivot and the wing spar or wing root in substantially the same plane, that is, by pivoting the wing to its axis by pivot means located at the general plane of the wing and/or by the introduction of flexibility at the root of the wing or the introduction of a vertically extending individual pivot for the blade, so as to relieve the wing, the pivot means, and the mounting, of stresses fore and aft in the plane of rotation. However, with certain rotors, built in accordance with either of said patents, there may be vibration and roughness in the rotor during operation, which obviously is unpleasant to the passengers, and ultimately would produce wear of the pivot mounting of the wing and perhaps even in time a weakening of the rotor mounting pylon.

Tests have shown that the major vibrations have arisen from some condition of resonance, due apparently to a synchronism between the rotational period of the rotor and the inherent vibration period of the blade or blades of the rotor or harmonics of the latter. In accordance with the present invention, I take advantage of this fact by stiffening the wing in its general plane of rotation, that is, by increasing its inherent rigidity and thus raising its inherent vibration period; and in conjunction with this I preferably widen the base of support of the single articulation which I provide for the wing. Thus an increase in the stiffness of the blade, in a direction fore and aft in the plane of rotation, is made; and I preferably make this stiffness of such a degree that the inherent vibration period of the wing or blade is considerably above any rotational speed of which the rotor will be capable in operation, and preferably also above the first or second major harmonics of the rotational speed. For example, (and not by way of limiting the invention to a rotor of any specific rotational speed), when a given rotor is designed to autorotate, in normal flight, at 150 R. P. M., the present invention contemplates the employment of a rotor blade or wing of such stiffness that, in and of itself (or in conjunction with a single articulation pivot by which it is mounted on the hub), it will have an inherent vibration period, at least in the plane of its chord, differing in frequency from such R. P. M., and preferably of a vibration frequency above said rotational speed, and still more desirably above the first or second major harmonic thereof; and thus, for example, a vibration frequency of several hundred vibrations per minute. Resonant or synchronous vibration so reduced as to make it quite advantageous to utilize but a single articulation for the wing, which articulation is preferably by means of a substantially elongated pivot or bearing, located generally in the plane of the wing or of its root end, and extending preferably substantially transverse the general axis of rotation of the rotor.

In addition to advantages hereinbefore mentioned, the present invention contemplates the elimination of inter-blade cables and cumbersome droop support cables; reduction of the number of of parts making up the rotor hub; the simplification of the blade to a form in which it is made up of only one piece, or of a few unified pieces; the production of an all-metal blade and supporting structure; and the improved carrying of the stresses from the blade itself to and through its attachment fitting or fittings. In general, these and other objects are obtained by forming the blade either of a plurality of stamped or rolled sections, suitably interconnected to form a hollow shell, or preferably by making it of one-piece drawn tubular construction; whereby the skin or shell of the blade itself takes all or the major part of the centrifugal, pressure, torsional, vibrational and other stresses encountered in flight. The rotative blade or wing according to this invention, may be formed or drawn either of symmetrical or non-symmetrical camber or profile; and, as shown in the present disclosure, it is preferably of uniform chord and profile except for the extreme outer tip portion, of uniform wall thickness from end to end, and of the same built-in pitch from end to end, although preferably made with just sufficient torsional flexibility to permit of a slight increase in pitch toward the tip when under flight load.

How the foregoing and other objects and advantages which are incident to the invention and which will occur to those skilled in the art are obtained, will be evident from the following description taken together with the accompanying drawings, in which drawings:

Fig. 1 is an outline side elevational view of a rotary-winged aircraft embodying the rotor and rotor blades of the present invention, the rotor shown being a three-blade rotor;

Fig. 2 is a fragmentary plan view of the rotor employed on the craft, the figure being taken on a somewhat larger scale;

Fig. 3 is an enlarged view approximately on the line 3—3 of Fig. 2;

Fig. 4 is a further enlarged view on the line 4—4 of Fig. 2;

Fig. 5 is an elevational view of the leading edge of the outer or tip portion of the left hand wing or blade of Fig. 2; and Fig. 6 is a sectional view similar to Fig. 4 of a modified form of the invention, embodying a blade of different profile formed of rolled or pressed sections of a different material, and with some internal stiffening.

In Fig. 1, the aircraft 2, having under-carriage 3—4, engine and propeller 5—6, empennage 7 and small fixed wings and ailerons 8—9, is provided with a primary sustaining system of rotative wings 10, flexibly or pivotally secured to a rotative hub 11 mounted on the pylon or supporting structure 12. The type of rotor employed is one in which each wing, as the machine moves translationally, may at least to some extent rise and fall, during its circle of rotation, in order to compensate for differences in flight forces, primarily differential lift forces on the several wings.

In Figs. 2 and 3 it will be observed that the rotary blade or wing 10 is of drawn tubular construction, secured to the hub 11 by means of a pivot or bearing member 13, positioned generally in the plane of the root end of the wing and extended generally horizontally or transverse the common rotational axis. Since the wing has no spar, or may itself be considered as being its own spar, it is preferably secured to the hub through the intermediation of a fitting 14.

Externally of the blade itself, the fitting preferably has a pair of widely spaced apart lugs or ears 15, so as to accommodate a wide hub portion and a very long pivot pin 13. Internally of the blade or wing, the fitting 14 may be divided into upper and lower portions 14a, 14b, preferably split into tongues or forks 16 and 17, which may be secured as by riveting, or more preferably spot welding (as shown at 18), to the inside of the upper and lower faces of the wing. At the very inner or root end of the blade the fitting 14 has a heavy transverse portion 19, extending across the attaching lugs 15, and over the inner face of which the blade shell may be bent; the upper part of the shell being bent down as indicated at 10a and the lower part being bent up as indicated at 10b, the two parts being preferably welded together along the line 10c, to assist in securing the blade to the fitting, and to close off the root end of the blade, so as to keep out moisture and the like, the lugs 15 being allowed to project as shown. If preferred, a separate closure member or plate may be employed, instead of bending over the blade surfaces 10a, 10b. The only additional structure necessary besides the hub itself and its internal bearings (not shown), is the transverse member 20, extending across between the attaching lugs 15, and located in a position to support the rotor blade against excessive downward droop when idle, through the intermediation of a small bumper block, preferably of rubber, indicated at 21, which may bear against the periphery of the hub member 11.

The drawn metal wing may be formed of some light material, such as any suitable aluminum alloy, and in Fig. 4 it will be seen that such a construction forms a continuous shell, which, in section, may be of non-symmetrical camber, and which is of integral form and preferably of substantially uniform wall thickness, the thickness being made ample to care for all loads and stresses carried by the blade, including the centrifugal force thereon, the lift force and other pressures, and any torsional or twisting force such as arises from the choice of a wing section having, during rotation, the center of pressure of the section ahead of the center of gravity thereon. The structural incidence of the blade may be (when at rest) substantially uniform throughout the major portion of its length. In its broader aspects, the invention is, of course, not limited to particular relative locations of the centers of pressure and gravity or other details.

In forming the blade itself, which may be of a single piece from end to end, the tube may be drawn out, to any desired sectional shape and thickness, and in lengths equal to more than one blade if desired. From the drawn tube, a full-length blade section may be cut straight off as indicated at 10d in Fig. 5. Viewed in plan (Fig. 2), the corner portions 10e may then be cut off on the proper curvatures for a smooth stream-line tip. It should, however, be understood that the full length of the blade shown in Fig. 2 would normally be approximately twice as long as the length there shown, for the chord indicated, or perhaps even a little longer. The upper and lower curved end portions are then brought together, as shown in Fig. 5, and welded along the line 10f. A sealed, hollow tubular blade or wing, which is its own spar, thus results. At the root end of the blade the fitting 14 (which may be a forging) is secured in place, the root end of the tube being bent over and welded along the chord line 10c and preferably also welded to the part 19 of the fitting; and to give an extremely smooth, efficient and neat surface the entire blade may be spray-painted or finished with enamel or some other suitable impervious coating, which will also protect the blade from the elements.

Referring now to the modification of Fig. 6, it will be seen that I have shown a symmetrically cambered rotative wing 10g, which may be made of thin, stainless, sheet steel, upper and lower plates 22—23 being stamped, rolled, or bent to form, brought together, and joined at intervals longitudinally thereof, as by means of rivets 24 and 25. Adjacent the high-pressure areas of the section, there may be applied to the sheets, before assembling, internal flange-strip stiffeners 26 and 27 at intervals along the length of the wing. A protective and smoothing coating 28, such as above described, is shown as applied to the blade or wing in Fig. 6.

The form of construction of Fig. 6, as well as the form shown in the other figures, may be secured to the pivot bearing or bearings of the hub by a fitting 14 similar to that heretofore described; it being understood that a sheet-steel blade or wing is preferably welded to the fitting, while one of aluminum alloy or other material is preferably attached by rivets or screws.

The tapering of thickness of the internal plate-like members 14a—14b of the fitting 14, the spreading or divergence of the forked ends 16—17 thereof, and the provision of a plurality of weld points, screws, rivets, or the like, 18, all cooperate to produce a gradual distribution or transfer of the centrifugal and other thrusts and loads from the tubular wing to the fitting itself and thence to the hub, and also provide a substantially self-supporting wing structure, when the wing is in drooped position, at rest, as in Fig. 3.

The elimination of cables with their whipping and vibration, the provision of a wide base for the elongated wing pivot 13 with resultant simple and rugged hub, and a substantial increase in rigidity of the wing, especially in its plane, with resultant material raising of the inherent vibration period thereof, all cooperate to produce smooth wing and rotor operation, to obviate resonant vibrations even when the vertical pivot for the wing is omitted, and to make the entire rotor aerodynamically cleaner and more efficient.

I claim:—

1. In an aircraft, means of forward propulsion, and a rotative sustaining system comprising a generally upright normally freely rotatable hub or axis member, a plurality of aeroform wings of greatly elongated plan form spaced thereabout in position to be aerodynamically actuable, and pivot means forming a single individual horizontally disposed pivot axis for each wing connecting the same to said axis member to provide freedom for at least some up and down swinging of the wing under varying flight forces, the said pivot axis comprising the sole articulation of the root end of the wing on the hub, the structure of the wings being so stiffened that the oscillative or vibrational period of the wings is such as to prevent building up of vibrations in resonance with the rotational period of the system.

2. A rotor blade of aeroform shape which includes, as a major part of its aeroform-shape-defining structure, a unified elongated metallic tubular shell member, said member being of substantially uniform exterior cross-sectional contour throughout a large part of its length and constituting the major element for carrying the centrifugal and other loads imposed on the blade in operation.

3. A rotor blade of very long and narrow plan form comprising as its own major part a unified elongated metallic tubular shell having an aerofoil surface contour and itself constituting the major element for carrying the centrifugal and other loads imposed on the blade in operation, and a pivot mounting element secured to said shell near the root end thereof.

4. A rotor blade comprising as its major part a unified elongated metallic tubular shell having an aerofoil surface contour and itself constituting the major element for carrying the centrifugal and other loads imposed on the blade in operation, said shell being of strength and stiffness such as to impart to the rotor blade as a whole an inherent vibration period different from the normal rotational period of the rotor.

5. A rotor blade comprising as its major part a unified elongated metallic tubular shell having an aerofoil surface contour and itself constituting the major element for carrying the centrifugal and other loads imposed on the blade in operation, said shell being of strength and stiffness such as to impart to the rotor blade as a whole an inherent vibration period higher than the normal rotational period of the rotor.

6. For an air rotor of the character described, an elongated narrow blade or wing formed as a tubular shell of substantially uniform aerofoil cross section throughout a major part of its length, said shell being constructed to carry the major part of the centrifugal, torsional, vibrational, and aerodynamic loads imposed thereon in flight.

7. For aircraft sustaining rotors and the like, a rotary wing comprising an elongated, centrifugal-load-carrying unitary shell, of aerofoil cros-section and of substantially uniform wall thickness in all parts of a given cross section thereof.

8. For aircraft sustaining rotors and the like, a rotory wing comprising an elongated centriugal-load-carrying unitary shell, of aerofoil cross-section and of substantially uniform chord throughout the major portion of the length of the wing.

9. For aircraft sustaining rotors and the like, a rotary wing comprising an elongated, centrifugal-load-carrying unitary shell, of aerofoil cross-section and of substantially uniform wall thickness along a given line throughout the major portion of its length.

10. A stressed-skin rotor blade comprising an elongated, unified metal tube of aerofoil cross section and of substantially uniform built-in pitch through a major portion of its length.

11. A hollow tubular rotor wing or blade comprising a metal shell of aerofoil cross section and having its sectional center of pressure ahead of the sectional center of gravity, said blade being of a substantially uniform pitch through a major portion of its length and being constructed with a degree of torsional flexibility whereby under the pressure loads in operation its pitch may increase toward the tip.

12. In an air rotor of the character described, a substantially tubular elongated blade or wing of aerofoil cross section formed of a shell capable of retaining its own aeroform shape under loads imposed upon it in operation, a rotative hub for mounting the blade and having a widebase pivot support, means for securing the blade to said support including a fitting of considerable width with relation to the blade chord attached to a substantial area of the inner portion of said blade, and the major portion of the length of the blade extending outwardly beyond said fitting and carrying its own loads.

13. A stressed-skin rotor wing or blade comprising an elongated, unified metal tube of aerofoil cross section which section is substantially uniform throughout a major portion of the length of the wing, a wing pivot fitting secured thereto adjacent its root end, and means for gradually or progressively distributing or transferring the centrifugal loads from said tube to the pivot portion of said fitting.

14. For an aircraft sustaining rotor normally turning in flight about an upright axis, a rotative wing of very long and narrow plan form and of aeroform cross section, with a built-in incidence capable of autorotational reaction at all angles of flight between forward translation and vertical descent, and the structure of said wing being so disposed therealong that throughout a major portion of its length it has a substantially uniform degree of stiffness, as against bending and the stiffness of the wing structure being materially greater as against bending in the plane of its chord as compared with its stiffness as against bending in a direction transverse its chord.

15. For an aircraft sustaining rotor normally turning in flight about an upright axis, a rotative wing of very long and narrow plan form and having its major structure composed of a hollow metallic tubular shell of sufficient strength and stiffness to carry a major portion of the pressure and centrifugal loads in flight, said shell being in large port of aeroform cross section, having a built-in incidence capable of autorotational reaction at all angles of flight between forward translation and vertical descent.

16. For an aircraft sustaining rotor normally turning in flight about an upright axis, a rotative wing of very long and narrow plan form and having its major structure composed of a hollow metallic tubular shell of sufficient strength and stiffness to carry a major portion of the pressure and centrifugal loads in flight, said shell being in large part of aeroform cross section, having a built-in incidence capable of autorotational reaction at all angles of flight between forward translation and vertical descent, and the structure of said wing being so disposed that throughout a major portion of its length it has a substantially uniform degree of stiffness, as against bending.

17. For an aircraft sustaining rotor normally turning in flight about an upright axis, a rotative wing of very long and narrow plan form and having its major structure composed of a hollow metallic tubular shell of sufficient strength and stiffness to carry a major portion of the pressure and centrifugal loads in flight, said shell being in large part of aeroform cross section, having a built-in incidence capable of autorotational reaction at all angles of flight between forward translation and vertical descent, and the structure of said wing being so disposed that throughout a major portion of its length it has a substantially uniform degree of stiffness, as against bending, and the stiffening of the wing structure being materially greater as against bending in the plane of its chord as compared with its stiffness as against bending in a direction transverse its chord.

18. In an aircraft, a normally air actuated sustaining rotor consisting of a plurality of wings and a rotor hub, said wings being formed as hollow metal aerofoils having a cross-section of substantially constant camber and constant built-in incidence throughout the major portion of their length, whereby the wings are extremely stiff in the plane of rotation, means for pivoting each wing to said hub on a horizontal pivot axis, said means providing a large base to effect a stiff and rigid connection of the wing to the hub, the combination of stiff wing and connection thereby giving the wings a high-frequency, low-amplitude vibrational period in the plane of rotation.

19. For aircraft sustaining rotors and the like, a substantially elongated tubular metallic rotary wing of which the tubing constitutes the major centrifugal load carrying structure and is itself formed in large part to an aerofoil cross-section; said tubular wing being of a fairly thick aeroform section which is externally smooth, without transverse ridges, and of approximately uniform profile, throughout a major portion of its length, whereby to present an autorotationally efficient shape to air-flow encountered at widely varying angles in the general plane of the wing.

JUAN DE LA CIERVA.